(12) United States Patent
Swithers (10) Patent No.: US 11,412,122 B1
(45) Date of Patent: Aug. 9, 2022

(54) CARD HOLDER SYSTEM

(71) Applicant: ADVANCED ELECTRONIC DESIGN, INC., North Attleboro, MA (US)

(72) Inventor: David Swithers, North Attleboro, MA (US)

(73) Assignee: Advanced Electronic Design, Inc., North Attleboro, MA (US)

( * ) Notice: Subject to any disclaimer, the term of this patent is extended or adjusted under 35 U.S.C. 154(b) by 0 days.

(21) Appl. No.: 17/396,444

(22) Filed: Aug. 6, 2021

Related U.S. Application Data (60) Provisional application No. 63/063,251, filed on Aug. 8, 2020.

(51) Int. Cl.
| | |
|---|---|
| *H04N 5/225* | (2006.01) |
| *H05B 47/115* | (2020.01) |
| *G03B 15/02* | (2021.01) |
| *G06F 3/02* | (2006.01) |
| *G06V 30/40* | (2022.01) |
| *G10L 15/22* | (2006.01) |
| *G06V 30/10* | (2022.01) |
| *G06F 9/451* | (2018.01) |
| *F16M 11/22* | (2006.01) |
| *F16M 13/02* | (2006.01) |
| *G06F 40/174* | (2020.01) |

(52) U.S. Cl.
CPC .......... *H04N 5/2257* (2013.01); *F16M 11/22* (2013.01); *F16M 13/02* (2013.01); *G03B 15/02* (2013.01); *G06F 3/021* (2013.01); *G06F 9/451* (2018.02); *G06V 30/40* (2022.01); *H05B 47/115* (2020.01); *G06F 40/174* (2020.01); *G06V 30/10* (2022.01); *G10L 15/22* (2013.01)

(58) Field of Classification Search
CPC ...... H04N 5/2257; F16M 11/22; F16M 13/02; G03B 15/02; G06F 3/021; G06F 9/451; G06F 40/174; G06V 30/40; G06V 30/10; H05B 47/115; G10L 15/22
See application file for complete search history.

(56) References Cited

U.S. PATENT DOCUMENTS

| | | | |
|---|---|---|---|
| 6,050,010 A * | 4/2000 | Garcia | G09F 13/22 40/124.02 |
| 2002/0134914 A1* | 9/2002 | Ziemba | G06K 7/10732 250/208.1 |
| 2006/0072822 A1* | 4/2006 | Hatzav | G03B 15/00 382/181 |

(Continued)

*Primary Examiner* — Jared Walker
(74) *Attorney, Agent, or Firm* — John J. Brooks, III; John Brooks Law LLC (57) ABSTRACT

A card holder system is provided comprising a holder body, a card holder component, a sensing means, a light source and a power source. The holder body generally provides the structural framework to which the other elements are coupled. The card holder component generally provides the ability for an element, like a card, to be removably retained in the holder body. The sensing means generally provides the ability for the card holder to automatically recognize an element such as an ID card being place in the card holder component. The light source generally provides the light to illuminate the card held in the card holder element. The power source generally provides the power for the sensing means and the light source.

17 Claims, 5 Drawing Sheets

(56) References Cited

U.S. PATENT DOCUMENTS

| | | | |
|---|---|---|---|
| 2011/0128360 A1* | 6/2011 | Hatzav | G03B 27/323 348/61 |
| 2013/0134219 A1* | 5/2013 | Lebaschi | G06K 7/10831 235/440 |
| 2013/0221101 A1* | 8/2013 | Lebaschi | G06K 7/10732 235/454 |
| 2017/0006986 A1* | 1/2017 | Sieber | F21S 9/02 |

* cited by examiner

CARD HOLDER SYSTEM

CROSS-REFERENCE TO RELATED APPLICATIONS

This application claims benefit to provisional U.S. Pat. App. No. 63/063,251, filed Aug. 8, 2020 and entitled "CARD HOLDER SYSTEM", the contents of which are herein incorporated by reference in their entirety.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Field of the Invention

This invention relates to holders of thin cards, in particular a holder for identification cards in confined spaces.

BRIEF SUMMARY OF THE INVENTION

The following summary is included only to introduce some concepts discussed in the Detailed Description below. This summary is not comprehensive and is not intended to delineate the scope of protectable subject matter, which is set forth by the claims presented at the end.

In one embodiment, a card holder system is provided comprising a holder body and a card holder component. In some embodiments, the holder body further comprises a coupling surface whereby the coupling surface couples the holder body to a second surface. In some embodiments, the card holder component comprises one selected from the group comprising: a channel, a restrictive channel, a frictional surface and a spring. In some embodiments, the card holder system further comprises a light source and a sensing means whereby the sensing means recognizes when an element is in the card holder component and turns on the light source to illuminate the surface of the element. In some embodiments, the card holder system further comprises an image sensor in communication with a processor. In some embodiments, the card holder system further comprises a reflective element.

In one embodiment, a card holder system is provided comprising a holder body, a card holding component configured to receive a portion of a planar card and retain the planar card with the holder body, a light source, a power source to power the light source, the light positioned on the holder body proximal to the card holding component whereby a surface of the planar card can be illuminated, and a sensor configured to sense when the portion of the planar card is in the card holding component and turn on the light source to illuminate the surface of the planar card. In some embodiments, the card holding component comprises a channel recess in the top surface of the holder body extending along the holder body length and the channel recess is configured to receive the portion of the planar card and retain the planar card in the channel recess. In some embodiments the holder body further comprises a first curved edge on a first end of the holder body and a second curved edge on a second end of the holder body, and the card holding component further comprises a first closed end on a first end of the card holding component and a second closed end on a second end of the card holding component. In some embodiments the card holding component comprises one selected from the group consisting of a restrictive channel, a frictional surface, an adhesive surface, and a clip.

In some embodiments the holder body further comprises a height and a bottom surface and the holder body further comprises a coupling surface on either a side surface of the holder body or the bottom surface of the holder body whereby the coupling surface couples the holder body to a second surface. In some embodiments the coupling surface is on the bottom surface of the holder body, the second surface comprises a computer keyboard, and the coupling surface further comprises an adhesive material to removably adhere the holder body to the computer keyboard. In some embodiments the coupling surface is on the side surface of the holder body, the second surface comprises a backside of a laptop computer screen, and the coupling surface further comprises an adhesive material to removably adhere the holder body to the backside of a laptop computer screen.

In some embodiments the holder body further comprises a coupling element whereby the coupling element couples the holder body to a second body. In some embodiments the holder body is integrated into a surface of a second body. In some embodiments the second body comprises a computer keyboard. In some embodiments the second body comprises a laptop computer.

In some embodiments the holder body further comprises a first curved edge on a first end of the holder body and a second curved edge on a second end of the holder body, and the card holding component further comprises a first closed end on a first end of the card holding component and a second closed end on a second end of the card holding component.

In some embodiments the card holder system further comprises an image sensor in communication with a processor. In some embodiments the card holder system further comprises a reflective element configured to reflect an image of the planar card to the image sensor whereby the image is communicated to the processor and the image is used to populate a field in a software application executed by the processor.

In some embodiments the card holder system further comprises an audio sensor in communication with a processor configured to receive an audio data whereby the audio data is communicated to the processor and the audio data is used to populate a field in a software application executed by the processor.

Other objects, features, and advantages of the techniques disclosed in this specification will become more apparent from the following detailed description of embodiments in conjunction with the accompanying drawings.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

COPYRIGHT NOTICE: A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to any software and data as described below and in the drawings hereto: Copyright © 2020-2021, Advanced Electronic Design, Inc., All Rights Reserved.

Card holding systems will now be described in detail with reference to the accompanying drawings. It will be appreciated that, while the following description focuses on a system that provides a lighted holder for an identification card, the systems and methods disclosed herein have wide applicability. For example only and not for limitation, law enforcement officers may be able view the ID cards of people they are investigating with the card holder system. And as another illustrative example, the card holder system may be used by delivery workers, tradespersons, salespersons or store cashiers to hold credit cards or identification cards when they confirm delivery or process payments for their customers. Notwithstanding the specific example embodiments set forth below, all such variations and modifications that would be envisioned by one of ordinary skill in the art are intended to fall within the scope of this disclosure.

The Technical Problem

In the law enforcement field, a technical problem exists in that when a law enforcement officer is investigating a vehicle incident from their police vehicle, there are times when it is very difficult to see the identification information (ID) from the driver's license. This information is critical for the officer to quickly gauge the situation and it is important to provide this information with minimal distractions to the officer. Any distractions or additional tasks for the officer introduces potential safety issues. And in particular, at night, it is difficult to view an identification card like a license in a dark car.

In addition to the problems seeing the license information, the interior of a law enforcement vehicle is full of equipment taking up room in the vehicle and taking the attention of the officer's hands. Any task that involves an officer's hands to perform potentially removes those hands from performing other tasks.

Similar technical problems are present for other mobile workers who may need to temporarily hold items such as credit cards while doing their jobs. For example, delivery workers, tradespersons, salespersons or store cashiers may have to hold credit cards or identification cards when they are confirming delivery or processing payments for their customers.

The Technical Solution

The card holder system solves several challenging technical problems with the current solutions available and provides a tool to improve the workflow for law enforcement officers. Currently, law enforcement officers will generally prop the ID card on a laptop keyboard. This solution puts the card in front of the light source and will sometimes obscure a portion of the screen. This solution also makes the card susceptible to loss within the vehicle if blown by a wind gust, if the vehicle is moved, or if movement in the vehicle dislodges the card. Similar challenges may be present for mobile workers.

The disclosed card holder provides a specific platform or body to hold the ID card separately provides a light source to illuminate the ID card. The card holder may more securely hold the card to avoid it being dislodged by other activities in the vehicle.

Embodiments of the disclosed card holder may also provide a platform on which other features, such as image sensors or light sources and integrated applications, may be provided.

The Practical Application of the Technical Solution

With this technical solution, law enforcement officers are able to more accurately and conveniently secure and view the ID cards of people they are researching. The technical solution also helps mobile workers such as delivery workers, tradespersons, salespersons or store cashiers to more conveniently hold credit or identification cards while performing other tasks such as confirming delivery or processing payments for their customers.

One Example Embodiment of the Card Holder System

Figure 1A:
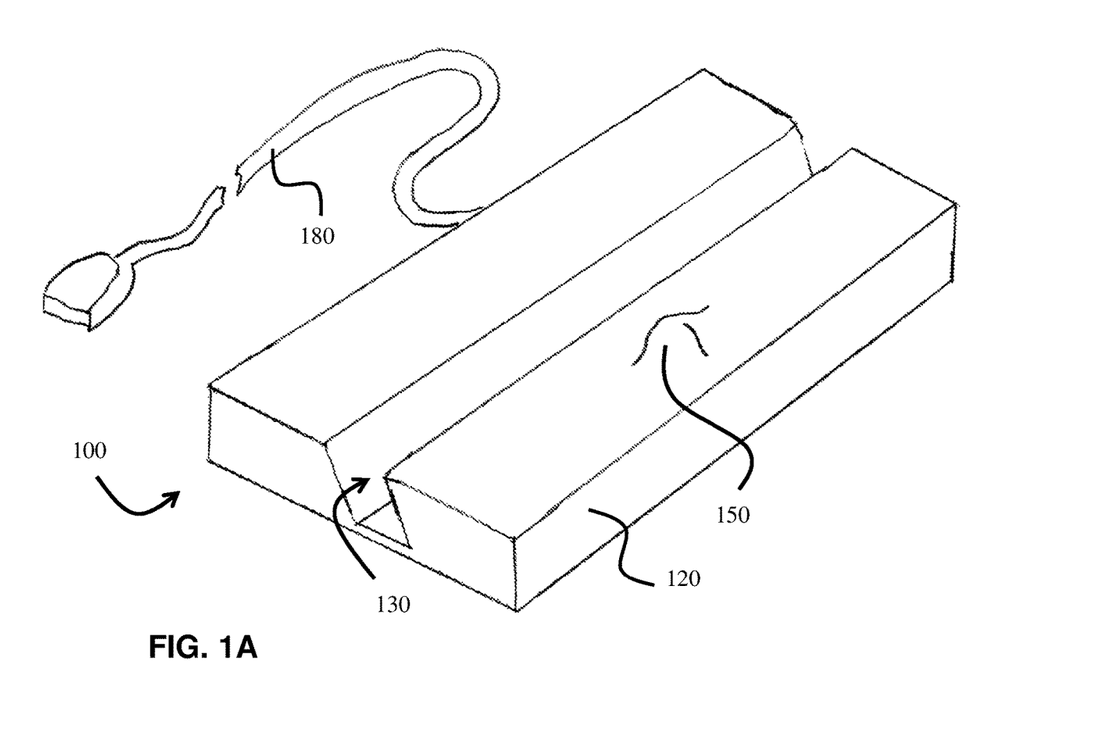
FIG. 1A shows a perspective view of one example embodiment of a card holder system.
Figure 1B:
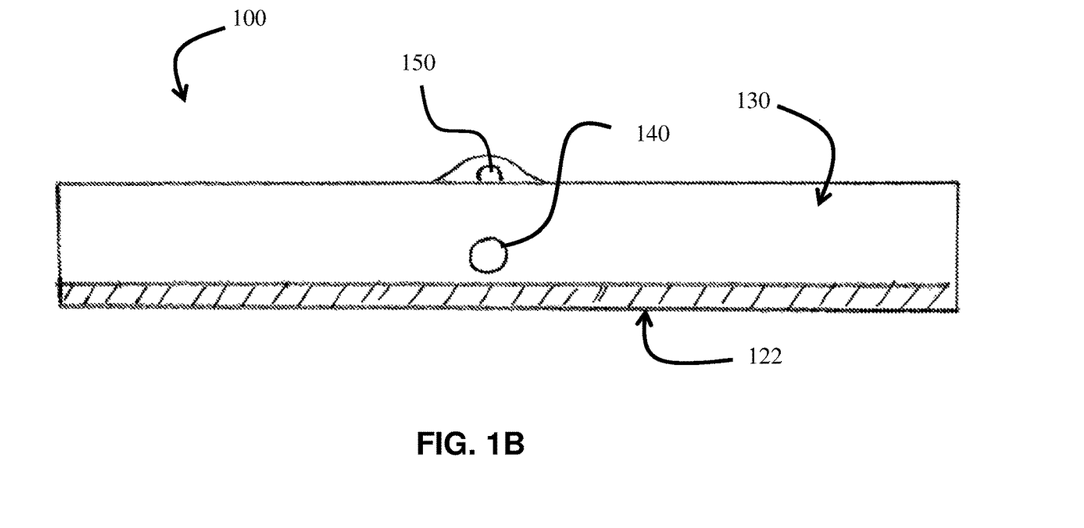
FIG. 1B shows a cut-away view of a card holder system of FIG. 1A illustrating an example embodiment of the sensing means.

For illustration purposes and not for limitation, one example embodiment of the card holder system is shown in FIGS. 1A and 1B where FIG. 1B is a side cutaway view of the embodiment of FIG. 1A. As shown in FIG. 1A, the card holder system 100 comprises a holder body 120, a card holder component 130, a sensing means (140 in FIG. 1B), a light source 150 and a power source 180.

The holder body 120 generally provides the structural framework to which the other elements are coupled. The holder body 120 generally comprises a length, a width and a top surface. In some embodiments, the holder body 120 further comprises a bottom surface. The holder body 120 may have a coupling surface (122 in FIG. 1B) with coupling means to couple the holder body 120 to a surface such as a computer shell or keyboard. In some embodiments, the coupling surface is on the bottom surface of the holder body 120. For example, and not for limitation, the coupling means may comprise an adhesive, an adhesive material, a magnet, or mating elements such as hook-and-loop fasteners or slots and channels. In some embodiments, the coupling means is a peel and strip adhesive on the coupling surface to adhere the holder body 120 to another surface. In some embodiments, the coupling means is a releasable coupling means to allow the card holder system 100 to be removably coupled to multiple surfaces such as the backside of a laptop computer display, on the surfaces surrounding the keyboard of a laptop computer, on a mounting device for a computer or any other surfaces in a vehicle. In some embodiments, the coupling means is a coupling strip with a width dimension less than 1 inch wide and in some embodiments, the coupling strip is ¾ of an inch wide. In some embodiments, the coupling means is a screw or bolt and a mating threaded recess. In some embodiments, the coupling means is a shape of the holder body that frictionally secures or clips the holder body to an element like around the edge of a computer screen.

The card holder component 130 generally provides the ability for an element, like a planar card, to be removably retained in the holder body 120. The card holder component 130 may be any type of means to provide a force on the element to retain it in relation to the light source 150. Embodiments of the card holder component 130 may have a front support and a rear support to put respective forces on the front and rear surface of the element. For example only, and not for limitation, the card holder component 130 may be any type of recess such as a channel recess or a slot in the holder body 120 configured to retain the element. The card holder component 130 may have components to provide additional friction on an element in the card holder component 130. These additional friction components may be clips, springs or other frictional elements to help keep the element in the card holder system 100 in the event the card holder system 100 is moved.

The sensing means 140 generally provides the ability for the card holder system 100 to automatically recognize an element such as an ID card being place in the card holder component 130. The sensing means 140 may also communicate information to turn on the light source 150. The sensing means 140 may be any type of sensor. For example only, and not for limitation, the sensing means 140 may be an Infrared (IR) sensor where the element breaks the beam when inserted into the card holder component 130. The sensing means 140 may also be a mechanical electrical switch or an optical sensor that senses when the element is placed in the card holder component 130.

The light source 150 generally provides the light to illuminate the element held in the card holder component 130. The light source 150 may be any type of light source. For example only, the light source 150 may be a Light-Emitting Diode (LED). In some embodiments, the light source 150 may be provided by an LED light providing uplighting onto the element (e.g., see FIG. 2A, 250).

The power source 180 generally provides the power for the sensing means 140 and the light source 150. The power source 180 may be any type of power source. For example only, and not for limitation, the power source 180 may be a battery or it may be a Universal Serial Bus (USB) cable coupled to the power source of a portable computer or vehicle.

Figure 2A:
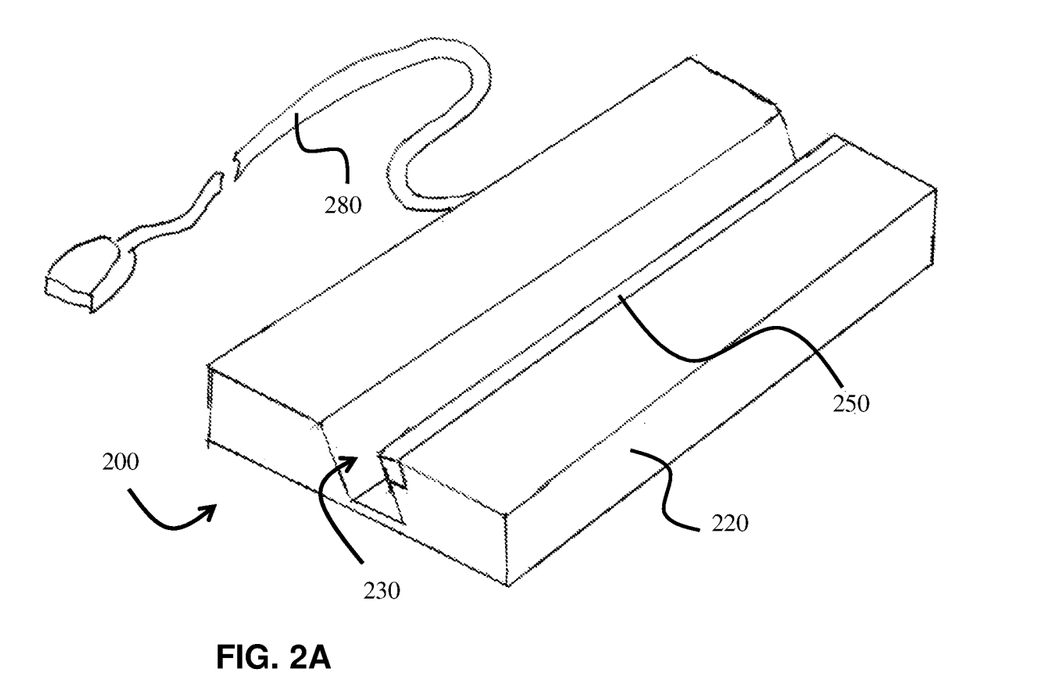
FIG. 2A shows a perspective view of one example embodiment of a card holder system.
Figure 2B:
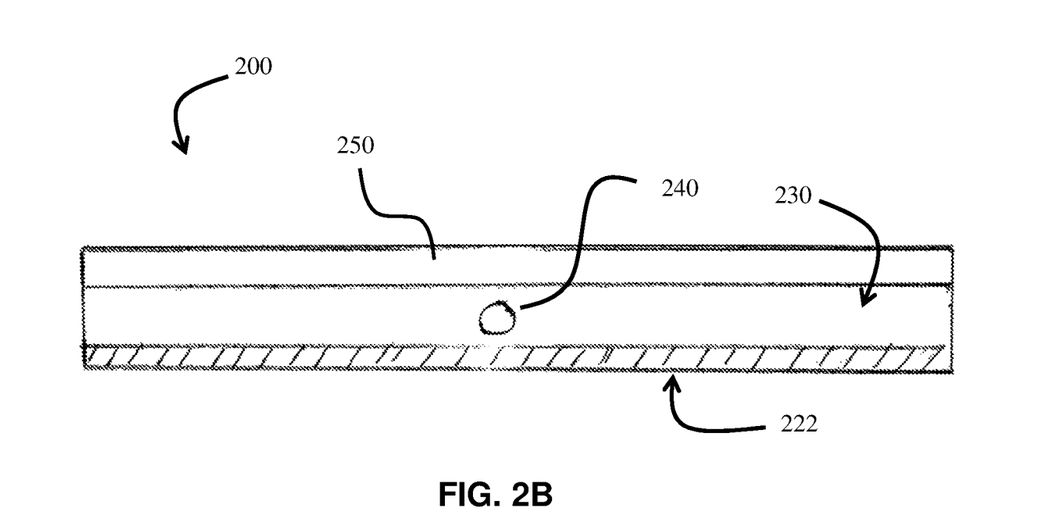
FIG. 2B shows a cut-away view of a card holder system of FIG. 2A illustrating an example embodiment of the sensing means.

FIGS. 2A and 2B show an example embodiment of a card holder system 200 comprising a holder body 220, a card holder component 230, a sensing means 240, a coupling surface 222, a light source 250 and a power source 280. In this embodiment, the light source 250 comprises an LED light that provides uplighting to light the element placed in the card holder component.

Figure 3:
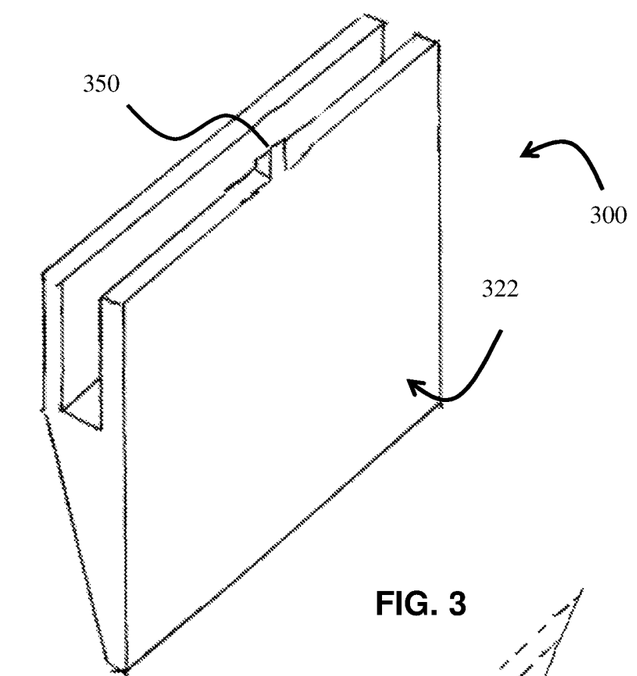
FIG. 3 shows a perspective view of another example embodiment of a card holder system.

FIG. 3 shows a perspective view of another example embodiment of a card holder system 300 showing a coupling surface 322 and a light source 350.

Figure 4:
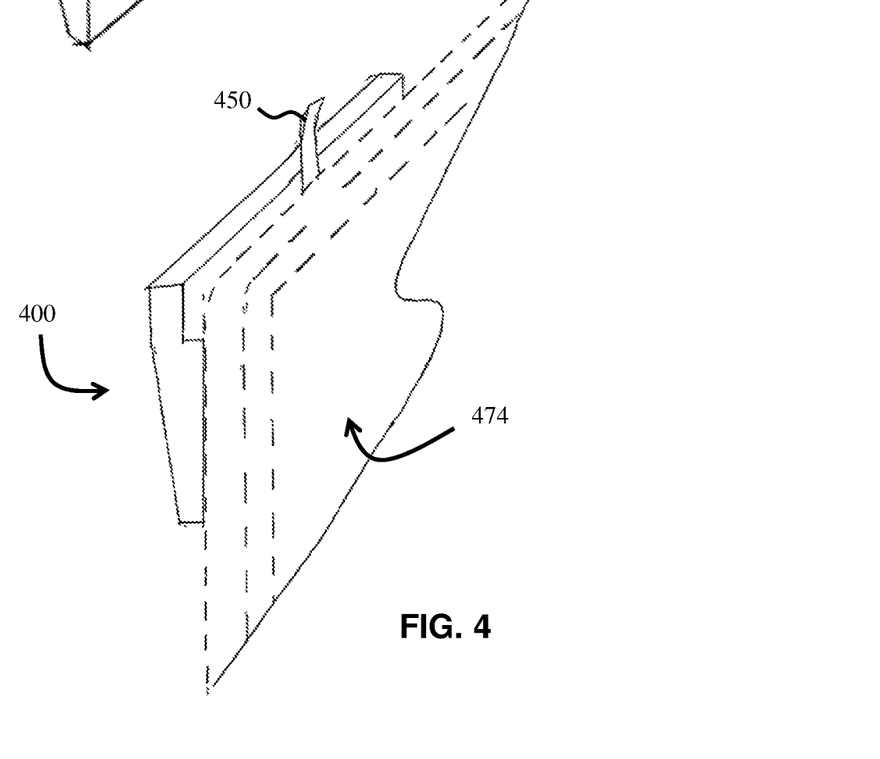
FIG. 4 shows a perspective view of another example embodiment of a card holder system.

FIG. 4 shows a perspective view of another example embodiment of a card holder system 400 with a light source 450 as mounted on the back of a laptop computer screen 474.

In some embodiments, the profile of the card holder system and its components is shaped to reduce the chance of user equipment snagging on the system. For example, the edges of the holder body may be rounded to reduce the profile of the system. Similarly, any protrusions such as the light source and power source would be rounded or otherwise shaped to reduce the chances of it snagging the equipment of a user.

Other Example Embodiments of a Card Holder System

Optionally, the card holder system may further include a communications means that is in communication with a processor and software code and application software that is able provide additional features to the card holder system. And in some embodiments, the card holder system may include the software code or application software that provides these additional features. The software code may include optical character recognition (OCR) software components that can recognize characters from an image sensor. The software code may include voice-to-text software components that can convert audio data from an audio sensor to text data. The software code may communicate data from image sensors and audio sensors to an application that is configured to interface with or populate database fields or interface with or populate database fields in a user interface. For example only and not for limitation, the software code may interface with or populate information used in a Law Enforcement Records Management Systems (RMS) database, the National Crime Information Center (NCIC) database, the Next Generation Identification (NGI) database, the National Instant Criminal Background Check System (NICS) database, the Law Enforcement Enterprise Portal (LEEP) database or the International Justice and Public Safety Network (Nlets) database.

For example, optionally, the card holder may further comprise an image sensor in communication with software code and application software that is able to scan or perform optical character recognition of the image sensed. For example, the light source in FIGS. 2A-2B, 3 and 4 may be a light source and/or an image sensor. With this embodiment, the image sensor may automatically read the information on a driver's license and pre-populate database fields in an application running on the computer. In some embodiments, the image sensor may be in communication with software code and application software that is able to recognize certain security mechanisms on the image sensed. For example, the image sensor (or sensors) and application software may be able to recognize holographic overlays on driver's licenses to confirm the validity of the image as a valid driver's license. As another example, the image sensor (or sensors) and application software may be able to recognize optically variable ink as color shifting ink on identification cards to confirm the validity of the card as a valid identification card.

As another example, optionally, the card holder may also comprise an audio sensor and a communication means that is in communication with software code and application software that is configured to receive and act on audio input from the sensor. With this embodiment, the audio sensor may automatically receive and translate the audio to text to pre-populate database fields in an application running on the computer.

As another example, optionally, the card holder may have a reflective element that allows a computer's existing camera or image sensor to view the card through the reflection in the reflective element. The reflective element may be any type of element that will reflect information on card to another element of the card holder system. For example only, and not for limitation, the reflective element may be a reflective surface like a mirror or it may be a reflective element like a prism. In some of these embodiments, the computer microphone may also be used to function as an audio sensor and allow the user to provide audio input to the card holder system.

Figure 5:
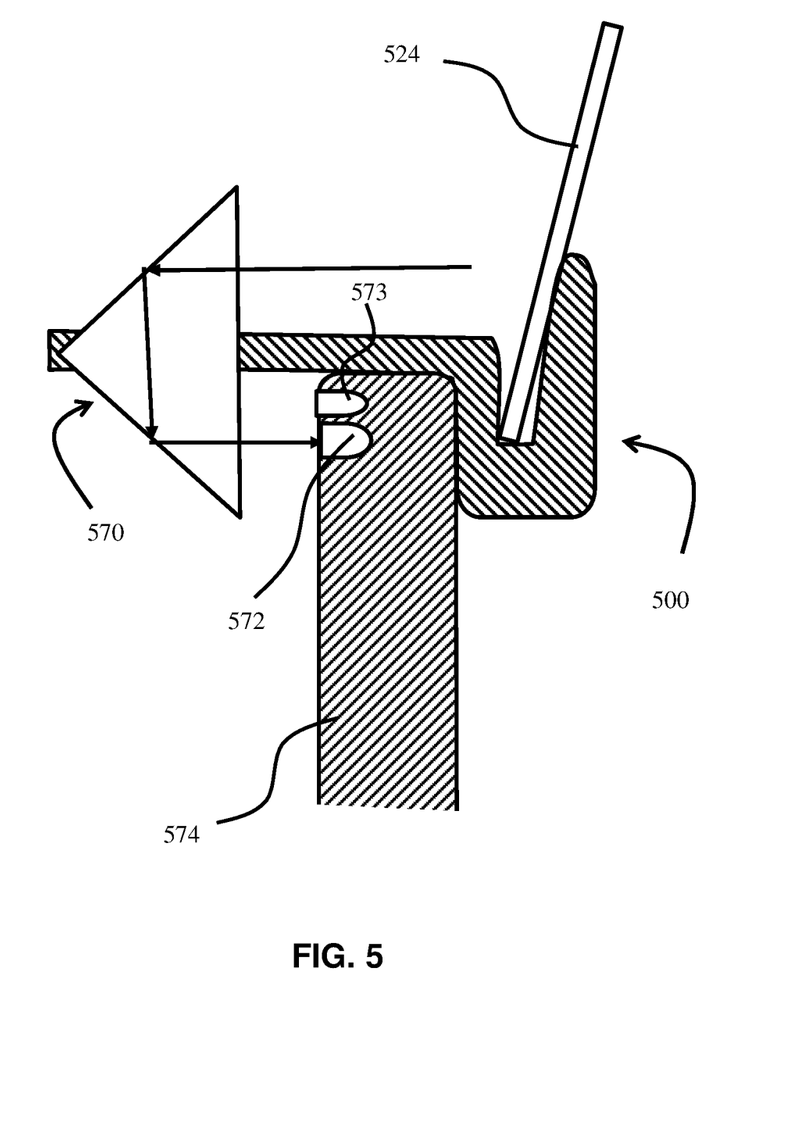
FIG. 5 shows a side cutaway of another example embodiment of a card holder system with a reflective element.

FIG. 5 illustrates an example embodiment of a card holder system 500 having a prism 570 (e.g., porro prism) acting as a reflective element that is configured to reflect the content of the card 524 so that a camera 572 can capture an image of the card 524. This embodiment also shows an example audio sensor 573 as part of the card holder system that may be found on a table or laptop computer. This embodiment is coupled to the back surface of a computer screen 574. In this embodiment, the computer may have an application program interface and an application programed to automatically read, store or perform other functions based on the information automatically read from the card 524 by the camera 572 or sensed by the audio sensor 573. It is understood that a reflective surface such a mirror may also provide similar features at the prism shown. It is also understood that the prism 570 utilized may be much smaller in scale than the one shown in FIG. 5.

Figure 6A:
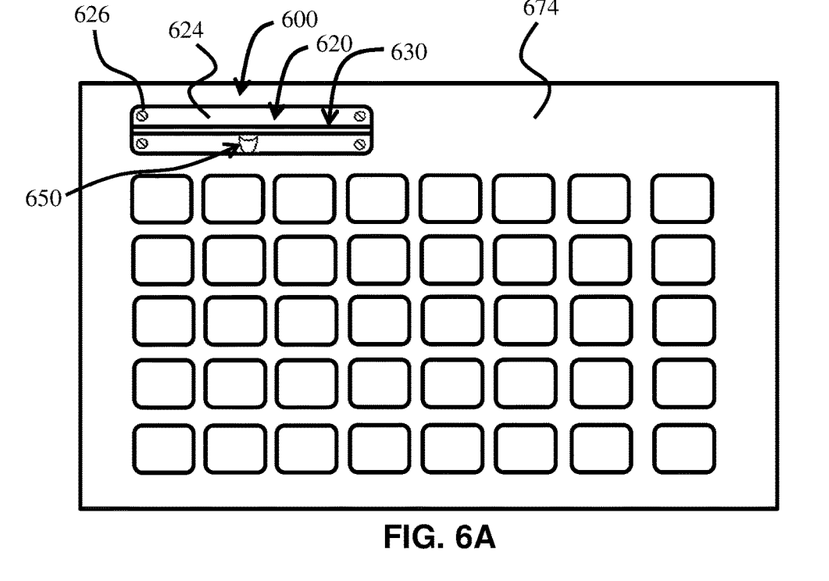
FIG. 6A shows a top view of another example embodiment of a card holder system mounted in or integrated into the casing of a computer keyboard.

FIG. 6A illustrates an alternative embodiment of the card holder system 600 configured to be mounted within another body 674 such as within a computer keyboard or within other portions of a computer body such as a laptop or a tablet. In this embodiment, the holder body 620 may have a length, a width and a top surface 624, a card holding component 630, a light source 650 and access to a power source. The holder body 620 may also have a coupling element 626 with coupling means to couple the holder body 620 to the second body 674. For example, and not for limitation, the coupling elements may comprise any of the coupling means described herein. In the embodiment shown, the coupling means comprises screws 626 or bolts and a mating threaded recess in the keyboard (not shown). In some embodiments, the coupling means is a shape of the holder body that frictionally secures or clips the holder body to the other body.

In some embodiments, the holder body is integrated to be part of the second body. For example, the holder body may be mounted or integrated into a portion of a keyboard, a laptop body or a tablet body.

Figure 6B:
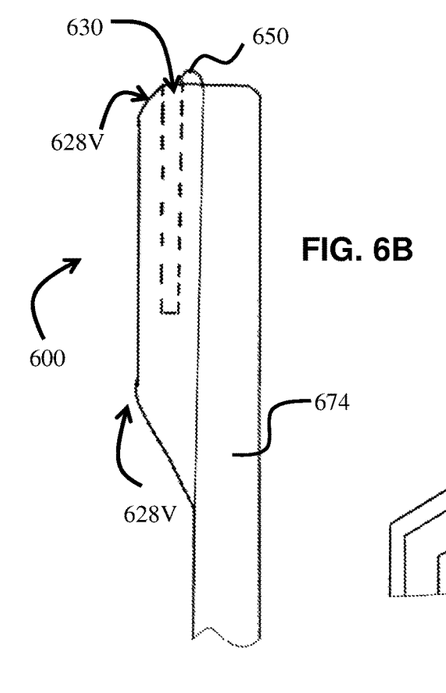
FIG. 6B shows a partial side view of an example embodiment of the holder body integrated into the casing of a tablet or a laptop computer.
Figure 6C:
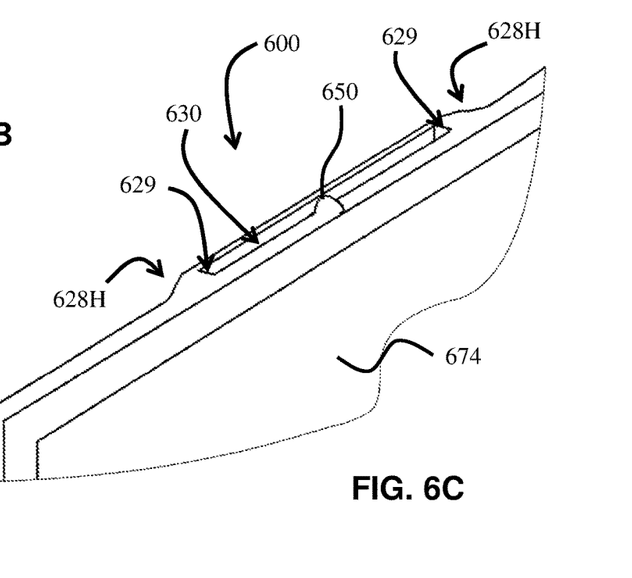
FIG. 6C shows a partial perspective view of an example embodiment of the holder body integrated into the casing of a tablet or a laptop computer.

FIGS. 6B and 6C illustrate an example embodiment of the holder body mounted or integrated into the casing of a tablet or a laptop computer. As shown, the holder body 600 is mounted or integrated into the rear side casing of a laptop computer screen 674. The card holding component 630 is accessible from the top of the screen 674 and the light source 650 is configured to illuminate the card. In this example embodiment, the holder body 600 includes curved edges in the vertical directions 628V and in the horizontal direction 628H (as a laptop is normally positioned). These curved edges allow the holder body 600 to be integrated into the casing in a manner to reduce the risk of clothing becoming caught on otherwise sharp edges. To further reduce the potential risk of sharp edges, the card holding component 630 has closed ends 629 to prevent clothing from being caught on edges of the opening of the card holding component 630.

Is it contemplated that the curved edges and closed ends of the holder body embodiments in FIGS. 6B and 6C may also be used in other embodiments of the holder body to reduce the risk of user catching equipment on the holder body.

Example Embodiments of the Card Holder System in Operation

Operation of one embodiment of the card holder system generally comprises the steps of inserting the card into the card holder component, engaging the sensing means which triggers the light source and viewing the card in the light from the light source. In these embodiments, the user views the content of the card and can manually enter data from the card into an interface such as a computer keyboard.

In embodiments where the card holder system includes or is in communication with processors or software components, the card holder system may include further operational steps. If the card holder system includes a reflective element and an image sensor, when the ecard is placed in the card holder component, the image sensor may communicate what is on the card, as viewed through the reflection, to an application to populate fields in a software application. Similarly, if the card holder system includes an audio sensor, when the card is placed in the card holder component and the user speaks, the audio sensor may sense what is received and communicate that to an application to convert voice data to text and use that text to populate fields in the software application.

For a law enforcement officer, this use may be done away from their vehicle when the card holder system is coupled to a remote device such as a tablet or laptop computer. The use may also be done inside the vehicle when the card holder it coupled to a device inside the vehicle or to a surface inside the vehicle.

Similarly, for a mobile worker such as a delivery worker, tradesperson, salesperson or store cashier, use may be done away from their vehicle when the card holder system is coupled to a remote device such as a tablet or laptop computer or it may be done inside the vehicle when the card holder is coupled to a device inside the vehicle or to a surface inside the vehicle. In some embodiments, use may also be within a building such as a retail store. In these embodiments, the card holder system may still be coupled to a remote device but the card holder system may also be coupled to a stationary device such as a point-of-sale device or other device/surface.

In some embodiments, the holder body is secured to a surface of a computer through coupling means such as an adhesive material on the coupling surface or on the back of the card holder body.

In some embodiments, a reflective element may be provided and positioned to allow the computer camera to see the card in the reflection of that surface. The reflective element may be a reflective surface or a reflective element such as a prism. In these embodiments, the use of the camera and applications to automatically scan and enter information from the card, helps reduce the tasks of the user who would have normally had to enter the information manually. The camera and application may be automatically turned on and opened when the sensing means recognizes a card in the card holder component.

Although this invention has been described in the above forms with a certain degree of particularity, it is understood that the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention which is defined in the claims and their equivalents.

I claim:

1. A card holder system comprising:
   a holder body having a length, a width and a top surface;
   a card holding component configured to receive a portion of a planar card and retain the planar card with the holder body;
   a light source;
   a power source to power the light source;
   the light positioned on the holder body proximal to the card holding component whereby a surface of the planar card can be illuminated;
   a sensor configured to sense when the portion of the planar card is in the card holding component and turn on the light source to illuminate the surface of the planar card; and
   an audio sensor in communication with a processor configured to receive an audio data whereby the audio data is communicated to the processor and the audio data is used to populate a field in a software application executed by the processor.

2. The card holder system of claim 1 wherein the card holding component comprises:
   a channel recess in the top surface of the holder body extending along the holder body length; and
   the channel recess is configured to receive the portion of the planar card and retain the planar card in the channel recess.

3. The card holder system of claim 2 wherein:
   the holder body further comprises a first curved edge on a first end of the holder body and a second curved edge on a second end of the holder body: and
   the card holding component further comprises a first closed end on a first end of the card holding component and a second closed end on a second end of the card holding component.

4. The card holder system of claim 1 wherein the card holding component comprises one selected from the group consisting of:
   a restrictive channel;
   a frictional surface;
   an adhesive surface; and
   a clip.

5. The card holder system of claim 1 wherein:
   the holder body further comprises a height and a bottom surface; and
   the holder body further comprises a coupling surface on one of a side surface of the holder body or the bottom surface of the holder body whereby the coupling surface couples the holder body to a second surface.

6. The card holder system of claim 5 wherein:
   the coupling surface is on the bottom surface of the holder body;
   the second surface comprises a computer keyboard; and
   the coupling surface further comprises an adhesive material to removably adhere the holder body to the computer keyboard.

7. The card holder system of claim 5 wherein:
   the coupling surface is on the side surface of the holder body;
   the second surface comprises a backside of a laptop computer screen; and
   the coupling surface further comprises an adhesive material to removably adhere the holder body to the backside of a laptop computer screen.

8. The card holder system of claim 1 wherein the holder body further comprises a coupling element whereby the coupling element couples the holder body to a second body.

9. The card holder system of claim 8 wherein the second body comprises a computer keyboard.

10. The card holder system of claim 8 wherein the second body comprises a laptop computer.

11. The card holder system of claim 1 wherein the holder body is integrated into a surface of a second body.

12. The card holder system of claim 11 wherein the second body comprises a computer keyboard.

13. The card holder system of claim 11 wherein the second body comprises a laptop computer.

14. The card holder system of claim 13 wherein:
    the holder body further comprises a first curved edge on a first end of the holder body and a second curved edge on a second end of the holder body: and
    the card holding component further comprises a first closed end on a first end of the card holding component and a second closed end on a second end of the card holding component.

15. The card holder system of claim 1 further comprising an image sensor in communication with the processor.

16. The card holder system of claim 15 further comprising a reflective element configured to reflect an image of the planar card to the image sensor whereby the image is communicated to the processor and the image is used to populate an additional field in the software application executed by the processor.

17. A card holder system comprising:
    a holder body having a length, a width, a height, a top surface and a bottom surface;
    a channel recess in the top surface of the holder body extending along the holder body length; the channel recess configured to receive a portion of an identification card and retain the identification card with the holder body;
    a coupling surface the bottom surface of the holder body whereby the coupling surface couples the holder body to a surface a backside of a computer screen;
    a light source;
    a power source to power the light source;
    the light positioned on the holder body proximal to the card holding component whereby a surface of the identification card can be illuminated;
    a sensor configured to sense when the portion of the identification card is in the card holding component and turns on the light source to illuminate a surface of the identification card;
    an image sensor in communication with a processor;

a reflective element configured to reflect an image of the identification card to the image sensor whereby the image is communicated to the processor and the image is used to populate a field in a software application executed by the processor; and an audio sensor in communication with a processor configured to receive an audio data whereby the audio data is communicated to the processor and the audio data is used to populate a field in the software application executed by the processor.

\* \* \* \* \*